Dec. 8, 1925.
J. B. JOHNSON
CIRCUIT ARRANGEMENT FOR DISCHARGE DEVICES
Filed April 7, 1919
1,565,157
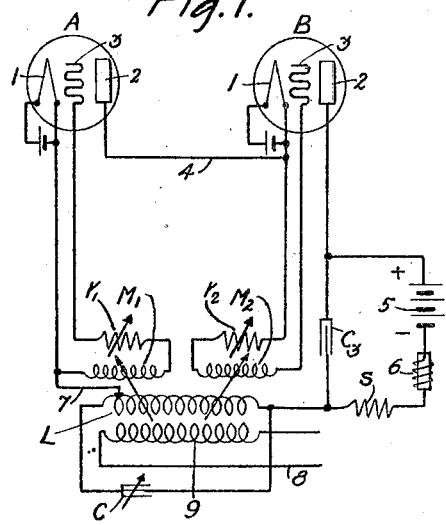
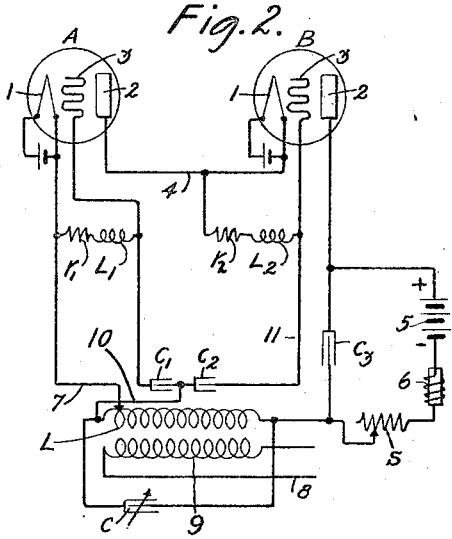
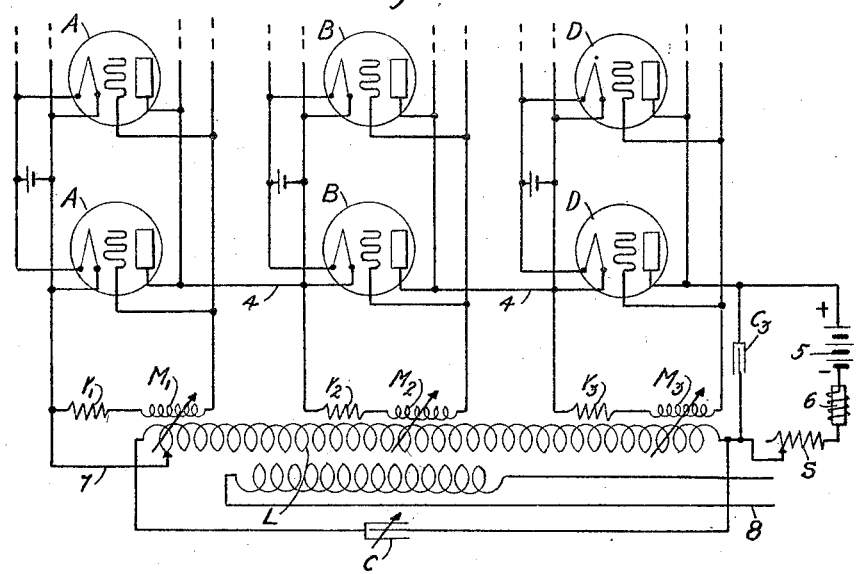
Inventor:
John B. Johnson
by J. E. Roberts
Att'y.

Patented Dec. 8, 1925.

1,565,157

UNITED STATES PATENT OFFICE.

JOHN B. JOHNSON, OF NEW YORK, N. Y., ASSIGNOR TO WESTERN ELECTRIC COMPANY, INCORPORATED, OF NEW YORK, N. Y., A CORPORATION OF NEW YORK.

CIRCUIT ARRANGEMENT FOR DISCHARGE DEVICES.

Application filed April 7, 1919. Serial No. 288,170.

*To all whom it may concern:*

Be it known that I, JOHN B. JOHNSON, a citizen of the United States, residing at New York, in the county of New York, State of New York, have invented certain new and useful Improvements in Circuit Arrangements for Discharge Devices, of which the following is a full, clear, concise, and exact description.

This invention relates to means for connecting and methods of operating a number of associated electric discharge devices.

The general object of the invention is to provide circuit arrangements for the association of a plurality of electron discharge devices whereby efficient operation thereof may be secured for the generation of large amounts of energy in the form of oscillatory currents or for other purposes.

A further object is to provide means for connecting electron discharge devices in such a manner as to utilize as a space current supply a source of higher electromotive force than can be efficiently utilized by impressing the electromotive force across a single discharge device. In the arrangement described herein this result is accomplished by placing the discharge devices or a plurality of groups of parallel discharge devices in a series circuit with respect to a source of electromotive force. In certain arrangements it may be desirable to connect the output circuits of the electron discharge devices in series. These two serial arrangements may be independently or concurrently useful. Hence it is within the scope of the present invention to provide means including either one or both thereof.

Other aspects of the invention relate to the provision of novel forms of electron-discharge generators wherein tubes are used in series or groups of parallel devices arranged in series.

Various advantages features will be pointed out in connection with the following detailed description which refers to the accompanying drawing, wherein Fig. 1 represents an embodiment of the invention having a plurality of vacuum tubes with electromagnetic input couplings arranged to function as an oscillation generator; Fig. 2 is a form in which capacitative input couplings are provided, and Fig. 3 is an application of the invention employing a series of parallel groups of vacuum tubes.

Referring to Fig. 1, vacuum tubes A and B are of the audion type, that is highly evacuated devices, having electrically heated filamentary or other suitable electron-emitting cathodes 1, anodes 2 and grid-like impedance controlling elements 3. The anode of tube A is connected by conductor 4 to cathode of tube B. A source 5 of space current has its positive terminal connected to the anode of tube B and its negative terminal connected to the cathode of tube A through the inductance coil L. A regulating resistance $s$ and inductance 6 may be provided to respectively regulate the electromotive force applied by the source 5 across the devices A and B, and to prevent high frequency currents from passing through the source 5. Elements 6 and $s$ are merely auxiliary and in no way essential to the operation. A portion only of the inductance L may be included in the circuit comprising the anodes 2 and cathodes 3 as is indicated by the adjustable connection of conductor 7 to coil L. Inductance coil L and variable capacity C constitute a tuned circuit which primarily controls the frequency which will be generated by the system. Coils $M_1$ and $M_2$ are coupled to the inductance L and have their terminals connected respectively to the grids 3 and cathodes 1. Resistances $r_1$ and $r_2$ may be placed in series with coils $M_1$ and $M_2$ respectively. The function of these resistances is to regulate the leakage current flowing between the grid and the cathode and they may be adjusted to any suitable value. Condenser $C_3$ is of a suitable value to offer a sufficiently low impedance to currents of the natural frequency of the circuit LC. Line 8, containing coil 9 which is electromagnetically coupled to the coil L, represents any suitable conductor or system in which the high frequency energy generated is to be utilized.

A series circuit which is conductive to the varying component of a fluctuating current may be traced from conductor 7 through the cathode and anode of tube A, conductor 4, cathode and anode of tube B, capacity $C_3$, and the circuit CL. The conductive spaces between the respective cathodes and anodes form a part of this circuit which may be regarded as the "alternating current output circuit" of the discharge devices. Variations of potential difference across the spaces of devices A and B will be impressed additively upon those elements of the circuit LC which are included in series therewith. The inductance L constitutes an energy transfer element through which high frequency alternating current is transferred into the circuit LC, and through which a portion of the energy existing in this circuit is transferred through coils $M_1$ and $M_2$ to the input circuits of devices A and B. Owing to the amplifying power of the devices A and B, oscillations will be set up and maintained in the tuned circuit LC.

A series circuit conductive to direct current may be traced from the connection 7 through device A, conductor 4, device B, source 5 and coil L. This circuit constitutes the space current supply circuit. It is not essential that this circuit and the alternating current output circuit have any portion external to the discharge devices in common. However, the portions of these circuits external to the discharge devices may be wholly or partly in common. Each discharge device functions as a repeater and produces in its output circuit amplified variations similar to those impressed upon the input circuit which is constituted by the coil $M_1$ or $M_2$ which is connected between the cathode and grid thereof.

Fig. 2 represents a circuit which differs from Fig. 1 in that the grids 3 are capacitatively coupled to the tuned circuit LC by means of capacities $C_1$ and $C_2$, which have one terminal connected in common to the circuit LC by the conductor 10, and the other terminals of the capacities are connected respectively to the grids 3 by the conductors 11. Resistances $r_1$ and $r_2$ correspond to resistances $r_1$ and $r_2$ in Fig. 1. Coils $L_1$ and $L_2$ preferably have a non-magnetic core and are designed to have a high inductance and offer a high impedance to currents of the frequencies corresponding to the natural period of the circuit CL. This prevents a high frequency short-circuit between the cathodes and the grids but allows direct current leakage of negative electricity from the grids. In other respects the system of Fig. 2 will be understood by reference to the description relating to Fig. 1.

Fig. 3 illustrates an arrangement of vacuum tubes suitable for use where large amounts of energy are to be made available. This system is generally similar to that of Fig. 1. A parallel system of electron discharge devices AA is connected in series by conductors 4, 4 with other parallel systems BB and DD. Conductors 4 connect the anodes of one system with the cathodes of the adjacent system. Leak resistance $r_1$, $r_2$, $r_3$ in series with input coils $M_1$, $M_2$, $M_3$ correspond respectively to each parallel system. The remaining elements of the system will be understood by reference to the description relating to Fig. 1.

It will be noted that while paralleling of vacuum tubes adds to the effective internal capacities between the various electrodes, arrangements in series may tend to reduce detrimental effects of certain internal capacities of the tubes, either by arranging the capacities in series with other capacities or by locating them in such a manner with respect to other parts of the circuit that the undesired effect is eliminated. The invention is not limited to the illustrated embodiments but may be embodied in other constructions within the scope of the following claims, wherein the generic and specific features of novelty are set forth.

What is claimed is:

1. An oscillation generator comprising a source of space current, a plurality of electron discharge devices having a plate circuit, grid circuits and a frequency determining circuit included in said plate circuit, means for coupling said plate and grid circuits, said devices being arranged in series with each other with respect to said source for converting the energy supplied by said source into oscillations.

2. An electron-discharge oscillation generator comprising a plurality of conductive spaces, a source of operating current, said spaces being in series with each other with respect to said source, an oscillation circuit, and means for synchronously varying the impedance of said spaces in accordance with currents in said circuit.

3. In a device for transforming unidirectional electric current energy into oscillatory currents, a source of energy to be converted, a plurality of cathodes and anodes in series circuit therewith, each adjacent pair of cathode-anode elements terminating a discharge path having a rising terminal difference of electromotive force as the current rises, a frequency determining circuit and means whereby current variations in said frequency determining circuit cause variations of impedance across said paths.

4. An electron-discharge generator comprising means for establishing a plurality of electron streams flowing in the same direction in a series circuit, impedance varying means for said streams, a circuit in which oscillatory currents are to be produced, said last mentioned circuit being in effective series with respect to said streams, and means whereby currents in said circuit react on said streams.

5. An oscillation generator comprising means for establishing a plurality of electron streams in space, a tuned circuit for determining the frequency of oscillations, and a series circuit including a portion of said tuned circuit and said plurality of streams, said streams flowing in the same direction in said series circuit.

6. An oscillation generator comprising a plurality of discharge devices, a source of current supply therefor, and a loop resonant circuit, said devices, said source and said circuit being in series.

7. An oscillation generating system including a plurality of electron-discharge repeaters, a closed circuit containing inductance and capacity, space current paths through said devices, a portion of said closed circuit being in series with said paths, and means to produce unidirectional current flow serially through said paths.

8. An oscillation generating system including a plurality of electron-discharge devices, an anode, a cathode and an impedance varying element for each of said devices, a closed resonant circuit, an operative connection from said circuit to the impedance varying element of each of said devices, a connection from another point of said circuit to the anode of one of said devices, and a connection from a point of said circuit remote from said second mentioned point to the cathode of the other of said devices, one of said last mentioned connections being conductive to direct current.

9. In a system including a plurality of space discharge tubes having anodes and cathodes and a circuit, said anodes and cathodes being connected in series for generating waves in said circuit, grids in said tubes, coupling coils included in said arrangement, said grids being connected to said coupling coils, and said coupling coils being insulated from each other and coupled to said circuit.

10. An oscillation generator comprising a plurality of electron-discharge devices each including an impedance varying element, a tuned oscillation circuit, means so connecting said devices and said circuit that voltage variations across said devices are impressed additively in series upon said circuit, and means for coupling said impedance varying elements to said circuit for varying the potential of said elements synchronously and in phase.

11. In combination, a plurality of vacuum tube repeaters, a common input source for said repeaters, an output circuit for said repeaters, said repeaters being serially arranged in said output circuit, and means for supplying waves of similar form to said repeaters substantially in phase.

12. In combination, a plurality of electron-discharge devices, an output circuit for said devices, input circuits for said devices, said devices being serially arranged in said output circuit, a source of energy, and connections to said input circuits from said source for supplying waves of similar wave form substantially in phase thereto.

13. In combination, a plurality of unsymmetrically conducting discharge devices, an output circuit therefor, input circuits therefor, said devices being serially arranged in and similarly poled with respect to said output circuit, and feed-back connections from said output circuit to said input circuits.

14. A generator comprising a circuit, a source of electromotive force in said circuit, a plurality of electron streams serially included in said circuit, and means for controlled by current in said circuit for synchronously impeding said streams.

15. In a system including a plurality of space discharge devices having anodes and cathodes and a circuit, said anodes and cathodes being connected in series-parallel for transmitting oscillations to said circuit, grids in said tubes, coupling coils included in said arrangement, said grids being connected to said coupling coils, and said coupling coils being insulated from each other and coupled to said circuit.

16. A system comprising a plurality of groups of parallel electron-discharge devices, a source of operating current therefor, said source and said groups being arranged in a series circuit, impedance varying elements for each of said devices, and means for synchronously varying the electrical condition of said elements.

17. A system comprising a plurality of evacuated vessels, a space discharge path in each of said vessels, an impedance varying element for each of said paths, said paths being grouped in parallel arrangement, a separate input circuit for each of said groups, a source of electromotive force, the paths of said groups and said source being arranged in a conductive series circuit.

18. The method of generating oscillations in a circuit which comprises causing synchronous variations of voltage across a plurality of conductive spaces, impressing the variations of voltage upon said circuit, and causing the instantaneous voltage variations across said circuit to be substantially equal in magnitude to the magnitude of the variation across one of the spaces multiplied by the number of spaces.

19. The method which comprises establishing in a circuit an electric current which includes a plurality of electron streams in series, and impeding said streams in accordance with the same wave form and substantially in phase.

20. The method of generating oscillations which comprises establishing an electric current in a circuit including a plurality of electron streams flowing in space in the same direction with respect to said circuit, and variably impeding each of said streams in accordance with variations of current in said circuit.

21. A system comprising a source of current, a plurality of electron-discharge devices in series with respect to each other and said source, a frequency determining circuit and means for synchronously varying the conductivity of said devices in accordance with current changes induced in said frequency determining circuit by said devices.

22. An oscillation generator comprising a plurality of discharge devices, said devices each having an input circuit, an output circuit therefor, each of said devices having a coupling between said input circuits and said output circuit, a source of current for said devices, and a loop resonant circuit, said devices, said source and said resonant circuit being in series.

In witness whereof, I hereunto subscribe my name this 20th day of March A. D. 1919.

JOHN B. JOHNSON.